Figure 1:
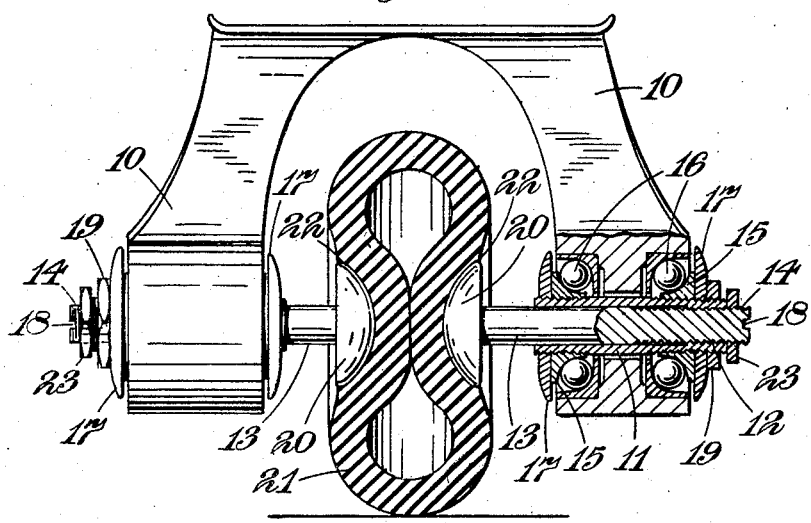

July 16, 1946.  G. A. BENNETT  2,404,269
WHEEL FOR VEHICLES
Filed March 13, 1945  2 Sheets-Sheet 1

Inventor
George A. Bennett
by Wilkinson & Mawhinney
Attorneys

July 16, 1946. G. A. BENNETT 2,404,269
WHEEL FOR VEHICLES
Filed March 13, 1945 2 Sheets-Sheet 2
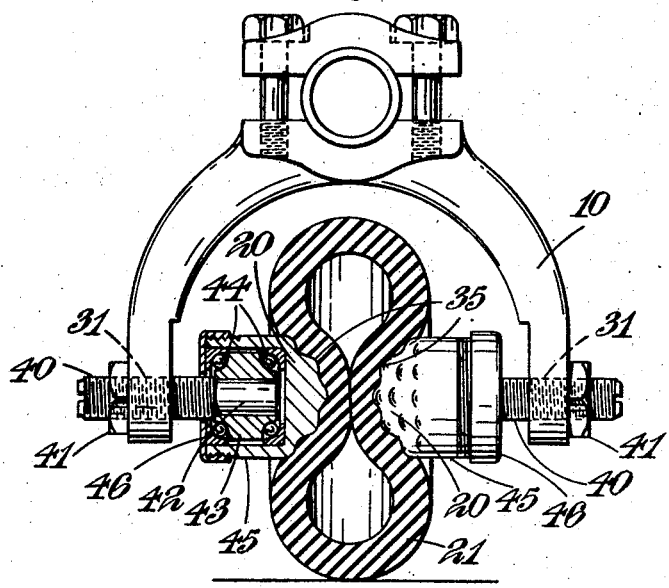
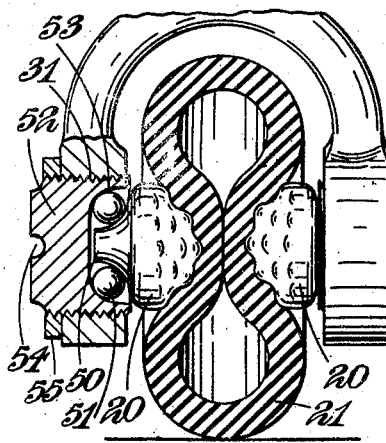
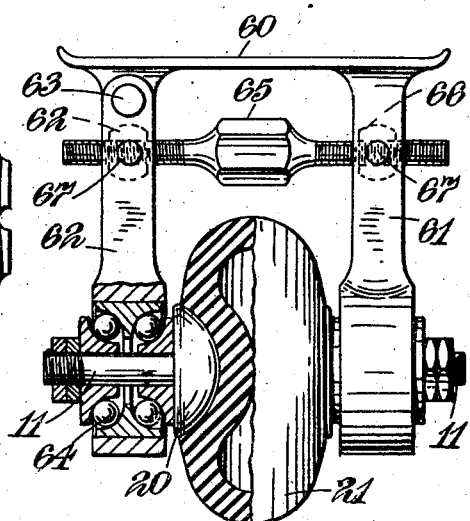
Inventor
George A. Bennett
by Wilkinson & Mawhinney
Attorneys

UNITED STATES PATENT OFFICE 2,404,269

WHEEL FOR VEHICLES

George Alfred Bennett, New Barnet, England; Hilda Mary Bennett executrix of said George Alfred Bennett, deceased Application March 13, 1945, Serial No. 582,535
In Great Britain February 2, 1944

13 Claims. (Cl. 301—1)

This invention relates to wheels for vehicles and is particularly, but not exclusively, applicable to wheels for trucks, barrows, perambulators, wheeled stretchers and other wheeled furniture and other vehicles mounted on wheels of small size.

According to the present invention a wheel for a vehicle comprises the combination with a support of two heads mounted on the support to rotate about a common axis and to face one another with a space between them, an imperforate, hollow and resilient tyre of which the exterior is a surface of revolution about an axis and which is mounted between the heads with its axis coaxial with the common axis of the heads, and means for adjusting one, or each, head axially towards the other to compress the tyre between them.

According to a feature of this invention the heads and tyre are arranged to interengage to prevent relative radial movement between them and, preferably, relative rotation between them.

The invention also includes various constructions by which the heads are rotatably mounted in the support with provision for axial adjustment relatively to one another.

Five constructions in accordance with this invention will now be described, by way of example only, with reference to the accompanying drawings in which each of the five figures shows a different construction in half-section on a vertical plane through the axle of the wheel.

Similar parts are given the same reference numerals in all the figures of the drawings.

The construction shown in Figure 1 comprises a U-shaped support 10 which is secured to the vehicle on which the wheel is to be mounted. A two-part axle is mounted in each arm of the support and each axle comprises a sleeve 11 having one end of its bore 12 reduced in diameter and screw-threaded and a rod 13 having one end 14 screw-threaded. The rod is a close fit in the sleeve and at its end 14 is screwed into the portion 12 of the sleeve. The sleeve 11 is externally threaded at each end to receive the inner races 15 of two ball-bearings 16 by which the axle is rotatably mounted in the support. The races 15 are locked to the sleeve by cover-washers 17 screwed onto the sleeve. The ball-bearings are arranged to take both radial and axial loads and may be replaced by taper-roller bearings. The sleeve 11 is thus restrained from axial movement while the rod 13 can be adjusted axially in the sleeve by rotating it by means of a screw driving in a slot 18 while the sleeve is held by a spanner on a nut 19 which is screwed onto the sleeve and locked thereon by burring over the threads projecting from it.

Each rod 13 carries a mushroom-shaped head 20 and the opposed faces of the two heads are convex surfaces of revolution about their common axis. It will be seen that the two heads 20 can be moved apart by screwing each rod 13 out of its sleeve 11. A tyre 21 is inserted between the heads 20 when the latter are separated as far as possible and this tyre is constituted by an imperforate hollow rubber sphere with two circular lips or ribs 22 struck about a common diameter of the sphere. The tyre is forced between the heads 20 in such manner that each head is central with respect to one of the lips 22 and the rods 13 are then screwed into their respective sleeves 11 so as to move the heads 20 towards one another into the position shown in Figure 1 and compress the tyre until it assumes the figure-of-eight section in a diametrical plane as shown. The compression of the tyre also compresses the air within it so that the tyre is inflated and pneumatically supported. Each rod 13 is then locked to its sleeve 11 by a lock-nut 23. The diameter of each lip 22 is such that it will engage the periphery of the associated head 20, when the tyre is fully compressed, and prevent radial movement of the tyre relatively to that head.

Instead of the exterior of the tyre being spherical, it may be spheroidal or any other suitable surface of revolution. In particular it may be convenient to form it with opposed depressions fitting the heads and serving to locate the tyre correctly on the heads as it is inserted between them.

Figure 2:
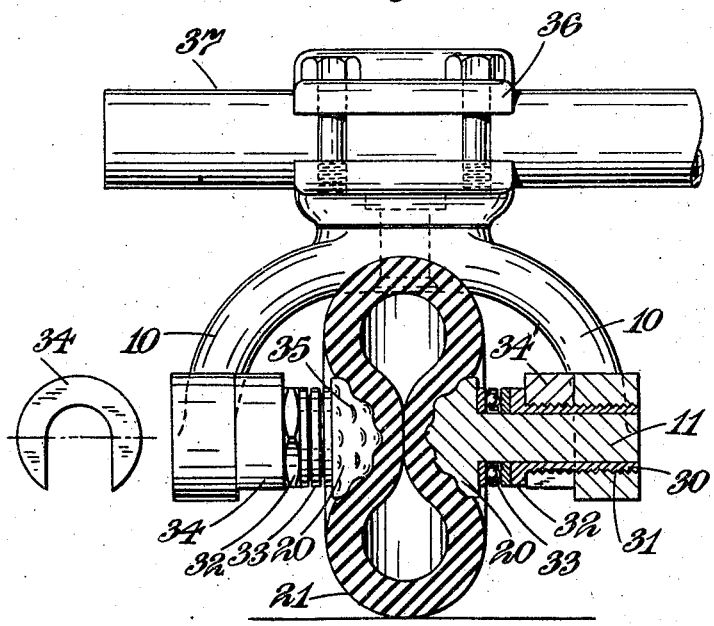

The construction shown in Figure 2 differs from that shown in Figure 1 mainly in that each head 20 is carried by a one-part axle 11 which is a running fit in a bearing member formed by a sleeve 30. Each sleeve 30 is externally screw-threaded and screwed into a screw-threaded bore 31 in the support 10 and each sleeve is also formed with a hexagonal flange 32 to receive a spanner by which it can be turned to adjust it axially in the support. A thrust ball-bearing 33 is interposed between each head 20 and the adjacent flange 32 to transmit the axial load from the head to the sleeve 30 and the support. When assembling the tyre 21 between the heads, the sleeves 30 are adjusted to bring the heads 20 slightly closer together than is shown in Figure 2 and a U-shaped distance-piece 34 (see also the detached plan of the distance-piece) is slipped over each sleeve between its flange 33 and the support. Each sleeve is then turned backwardly to tighten its flange 32 against the associated distance-piece 34 and clamp the latter in position. The axial load on the sleeves will tend to hold the flanges 32 tight against the distance-pieces so that the parts are securely locked in their working positions.

The heads 20 are shown in Figure 2 as being formed with a pattern in low relief formed by pimple-like protuberances 35 which interengage with the wall of the tyre to resist both relative radial movement and relative rotation between the tyre and each head. A dimpled pattern could also be used. The pattern on the head thus serves the purpose of the lips 22, shown in Figure 1, on the tyre and these lips may be omitted.

Figure 2 also illustrates how the wheel may be mounted as a castor on a vehicle. The support 10 is mounted to swivel about a vertical axis passing to one side of the axis of the wheel, in a bracket 36 which is arranged so that it can be clamped onto a tube 37 forming part of a tubular frame of the vehicle.

The construction shown in Figure 3 is an inversion of that shown in Figure 2 in that each bearing member is in the form of an axle 40 having a screw-threaded portion that is screwed into the bore 31 of the support and is locked in its adjusted axial position by a lock nut 41. Each axle 40 is formed with a plain portion 42 of reduced diameter to receive an inner race 43 common to two roller-bearings 44 which are received within, and support, a tubular extension 45 of the associated head 20. The roller bearings are arranged to carry both radial and axial loads and are held in position by caps 46 screwed onto the extensions 45. Figure 3 also illustrates how the support 10 may be clamped directly onto a tubular part of the vehicle frame.

In the construction shown in Figure 4, each head is shaped at 50 to form the inner race of a ball bearing 51. Each bearing member is constituted by a plug 52 screwed into the appropriate bore 31 in the support and shaped at 53 to act as the outer race of the bearing 51. Each bearing member 53 is adjusted axially by rotating it by means of a screw driver slot 54 and is locked in position by a lock-nut 55. It will be noted that the diameter of each bore 31 is sufficient to allow of the associated head moving into it when the heads are widely separated and the construction has the advantage that the width of the support 10 along the axis of the wheel is less than in those previously described. The construction can be inverted so that the heads provide the outer races and the plugs the inner races of the bearings.

In the construction shown in Figure 3, the support comprises a base 60 having an arm 61 rigid with it and an arm 62 pivoted to it at 63. Each head 20 is carried by an axle 11 and the axles are mounted respectively by ball bearings 64 in the outer ends of the arms 61 and 62. The arms 61 and 62 are interconnected by a turnbuckle 65 engaged with nuts 66 that are pivoted at 67 on the arms 61 and 62 so that the arm 62 can be swung towards and away from the arm 61 to move the heads 20 together or apart.

Of the five constructions illustrated, those shown in Figures 2, 3 and 4 are preferred.

I claim:

1. A wheel for a vehicle, comprising the combination with a support of two heads mounted on the support to rotate about a common axis and to face one another with a space between them, an imperforate, and resilient tyre of which the exterior is a surface of revolution about an axis and which is mounted between the heads with its axis coaxial with the common axis of the heads, and means for adjusting one, or each, head axially towards the other to compress the tyre between them.

2. A wheel according to claim 1, wherein the opposed faces of the heads are each formed generally as a convex surface of revolution about the axis of the head.

3. A wheel according to claim 1, wherein the opposed faces of the heads are each formed with a pattern in low relief to interengage with the tyre and prevent radial movement of the tyre relatively to the heads.

4. A wheel according to claim 1, wherein the opposed faces of the heads are each formed generally as a convex surface of revolution about the axis of the head and are each formed with a dimpled pattern in low relief to inter-engage with the tyre and prevent radial movement and rotation of the tyre relatively to the heads.

5. A wheel according to claim 1, wherein the tyre is formed externally with two diametrically opposed circular lips to fit the peripheries of the heads and prevent radial movement of the tyre relatively to the heads.

6. A wheel for a vehicle comprising the combination with a support, of two bearing members mounted in the support for adjustment towards one another along a common axis, two heads mounted one in each bearing member to rotate about said axis but restrained from axial movement in its bearing member, and face one another with a space between them, an imperforate and resilient tyre of which the exterior is a surface of revolution about an axis and which is mounted between the heads with its axis coincident with the common axis of the bearing members, and means for adjusting at least one bearing member along the said common axis towards the other to compress the tyre between the heads.

7. A wheel for a vehicle comprising the combination with a support formed with spaced internally screw-threaded bores having a common axis, of two externally screw-threaded bearing members screwed one into each bore, means for locking each bearing member against rotation in its bore, two heads mounted one in each bearing member to rotate about the said axis but restrained from axial movement relatively to its bearing member, and an imperforate resilient tyre of which the exterior is a surface of revolution about an axis and which is mounted between the heads with its axis coincident with the common axis of the bearing members and is compressed between the heads by rotation of the bearing members in the directions to move the heads towards one another.

8. A wheel according to claim 7, wherein each bearing member is in the form of a sleeve and each head is carried by an axle journalled in the appropriate bearing member.

9. A wheel according to claim 7, wherein each bearing member in the form of a sleeve which is formed with a non-circular flange, by which it can be rotated, on its end nearest to the associated head, each head is carried by an axle journaled in the appropriate bearing sleeve and the means for locking each bearing sleeve comprises a U-shaped distance member detachably mounted on it between the flange and the support and clamped therebetween by tightening up the bearing sleeve on it.

10. A wheel according to claim 7, wherein a thrust ball- or roller-bearing is interposed between each head and the associated bearing member to transmit the axial load on the head to the bearing member.

11. A wheel according to claim 7, wherein each bearing member and the associated head are shaped to form one the inner race and the other the outer race of a single row ball- or roller-bearing completed by balls or rollers inserted between them and arranged to transmit both radial and axial loads.

12. A wheel according to claim 1, wherein each head is carried by one part of a two-part axle of which the other part is rotatably mounted in the support and restrained against axial movement relatively thereto and which parts are formed with interengaged male and female screw-threads so that they can be adjusted axially relatively to one another by rotating one relatively to the other.

13. A wheel according to claim 1, comprising two internally screw-threaded sleeves mounted coaxially in the support to rotate about their common axis but restrained from axial movement and two externally screw-threaded rods extending one through each sleeve in screw-thread engagement therewith and carrying the two heads, respectively on their adjacent ends.

GEORGE ALFRED BENNETT.